United States Patent
Sugimura et al.

(10) Patent No.: US 7,228,673 B2
(45) Date of Patent: Jun. 12, 2007

(54) SEASONING TREATMENT SYSTEM

(75) Inventors: Kazuya Sugimura, Ritto (JP); Takao Yoshikawa, Ritto (JP); Masahiko Tatsuoka, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/518,244

(22) PCT Filed: Jun. 25, 2004

(86) PCT No.: PCT/JP2004/009002

§ 371 (c)(1),
(2), (4) Date: Dec. 16, 2004

(87) PCT Pub. No.: WO2005/004622

PCT Pub. Date: Jan. 20, 2005

(65) Prior Publication Data

US 2005/0208185 A1    Sep. 22, 2005

(30) Foreign Application Priority Data

Jul. 11, 2003   (JP) .............................. 2003-273205

(51) Int. Cl.
   *B65B 35/54*   (2006.01)
   *B65B 9/20*    (2006.01)
(52) U.S. Cl. .......................................... 53/154; 53/551
(58) Field of Classification Search .................. 53/474, 53/154
   See application file for complete search history.

(56) References Cited

U.S. PATENT DOCUMENTS

| | | | | |
|---|---|---|---|---|
| 2,145,941 A | * | 2/1939 | Maxfield ...................... | 53/433 |
| 2,923,114 A | * | 2/1960 | Miller et al. ................. | 53/510 |
| 3,719,021 A | * | 3/1973 | Rosenberg ................... | 53/551 |
| 3,912,535 A | * | 10/1975 | Rauser ...................... | 134/22.15 |
| 4,606,174 A | * | 8/1986 | Berg .......................... | 53/451 |
| 4,757,667 A | * | 7/1988 | Elsner ........................ | 53/415 |
| 4,769,974 A | * | 9/1988 | Davis ........................ | 53/433 |

(Continued)

FOREIGN PATENT DOCUMENTS

JP    38-20287 A    10/1963

(Continued)

*Primary Examiner*—John Sipos
(74) *Attorney, Agent, or Firm*—Global IP Counselors, LLP

(57) ABSTRACT

The present invention provides a seasoning processing system capable of uniform seasoning and, moreover, having superior cleanability. A seasoning processing system (2) according to the present invention comprises a seasoning dispersion apparatus (20) and a vertical pillow-type bag manufacturing and packaging apparatus (30). The seasoning dispersion apparatus (20) disperses powdered seasoning to be adhered to supplied intermediate articles (X ... X) from an end part (22b), which is a dispersing mouth, of a second conduit (22). The vertical pillow-type bag manufacturing and packaging apparatus (30) introduces and packages inside a bag shaped packaging material (Fc) seasoned articles (X2 ... X2) to which the powdered seasoning has been adhered. Furthermore, the end part (22b), which is the dispersing mouth, of the second conduit (22) is provided and arranged so that it is positioned inside the bag shaped packaging material (Fc). A first electrical charging mechanism is provided to charge the seasoning with a polarity and a second electrical charging mechanism is provided to a transverse sealing mechanism of the packaging material to charge the packaging material with the same polarity as the seasoning. In this manner the seasoning and the packaging material repel each other during the sealing operation.

12 Claims, 5 Drawing Sheets

U.S. PATENT DOCUMENTS

| | | | | |
|---|---|---|---|---|
| 4,897,273 A | * | 1/1990 | Kotaki et al. | 426/118 |
| 4,964,259 A | * | 10/1990 | Ylvisaker et al. | 53/433 |
| 5,361,560 A | * | 11/1994 | Sandolo | 53/111 RC |
| 7,117,653 B2 | * | 10/2006 | Yakushigawa et al. | 53/53 |
| 2004/0020941 A1 | * | 2/2004 | Engesser et al. | 222/135 |

FOREIGN PATENT DOCUMENTS

| | | |
|---|---|---|
| JP | 53-18750 A | 2/1978 |
| JP | 01-120251 A | 5/1989 |
| JP | 171913 A | 6/2002 |

* cited by examiner

SEASONING TREATMENT SYSTEM

FIELD OF THE INVENTION

The present invention relates to a system for performing the process of seasoning intermediate articles, and pertains to the technical field of foodstuffs manufacturing.

RELATED ART

Conventionally, when manufacturing seasoned articles like potato chips, seasoning processing is performed wherein intermediate articles like sliced potatoes fried with oil are seasoned with seasoning and the like. The seasoning processing system recited in Patent Document 1 is an example of such a system.

In this system, a seasoning apparatus having a constitution that uses the electrostatic effect to disperse and adhere powdered seasoning to falling intermediate articles is provided between a weighing apparatus and a packaging apparatus that are disposed vertically. Thereby, the powdered seasoning favorably and uniformly adheres to the intermediate articles. Namely, after the weighing apparatus weighs a prescribed weight of the intermediate articles, they are seasoned by the seasoning apparatus disposed below. Consequently, the powdered seasoning does not adhere to the path of the supply of articles to the weighing apparatus, nor the areas in each part of the weighing apparatus that directly contact the articles, as in the known seasoning processing systems, thereby making it unnecessary to clean these areas of the apparatus during product changeover.

PATENT DOCUMENT 1

Japanese Published Patent Application No. 2002-171913 (FIG. 1)

DISCLOSURE OF THE INVENTION

However, even in the system recited in Patent Document 1, cleaning of members is required every time changing over the product, including members such as the seasoning chute that provides the seasoning space and that is arranged below an intake chute that takes in the supplied intermediate articles, a discharge chute arranged below that seasoning chute and that discharges seasoned articles to the packaging apparatus, and a former of a vertical pillow-type bag manufacturing and packaging apparatus that receives the discharged seasoned articles and that tubularly bends the strip packaging material. In addition, these are generally large members, making the cleaning work troublesome.

Herein, the present invention takes the above circumstances into consideration, and has an object to provide a seasoning processing system capable of uniform seasoning processing and, moreover, having superior cleanability.

To solve these problems, the present invention is constituted as follows.

A seasoning processing system according to the first aspect of the present invention includes a dispersing means and a packaging means. The dispersing means disperses from a dispersing mouth powdered seasoning to be adhered to supplied intermediate articles. The packaging means disposes and packages inside a bag shaped packaging material the seasoned articles to which the powdered seasoning has been adhered. Further, the dispersing mouth of the dispersing means is provided and arranged so that it is positioned inside the bag shaped packaging material.

According to the first aspect of the present invention, because the powdered seasoning is dispersed inside the bag shaped packaging material, the dispersed powdered seasoning favorably adheres to the intermediate articles supplied inside the bag shaped packaging material, thus readily obtaining seasoned articles.

Furthermore, if powdered seasoning of a weight in accordance with one bag's worth of intermediate articles is dispersed, a fixed amount of the powdered seasoning adheres to the intermediate articles, therefore enabling continuously uniform seasoning processing.

Furthermore, the wasteful consumption of powdered seasoning is avoided, e.g., the powdered seasoning collection apparatus needed in conventional systems is no longer required.

In addition, because the powdered seasoning is dispersed inside the bag shaped packaging material, the area of the apparatus to which the powdered seasoning adheres, or the area of the apparatus that makes contact with the seasoned articles to which the powdered seasoning has been adhered is reduced. In other words, in the conventional case, it is necessary every time the product is changed over to clean, for example, a seasoning chute that provides the seasoning space, a discharge chute that faces and opens to the packaging means below, or, if the packaging means is a vertical pillow-type bag manufacturing and packaging apparatus, the former and the like that receive the seasoned products and tubularly forms the strip packaging material. These members are generally large, and the work of cleaning them is troublesome. In contrast, according to the first invention, a dispersing mouth is provided and arranged that disperses the powdered seasoning inside the bag shaped packaging material supplied to the packaging means, and the area of the apparatus to be cleaned is localized to, for example in the bag manufacturing and packaging apparatus, the downstream side end part of the former, and the like, thus facilitating the work of cleaning the seasoning processing system.

The seasoning processing system according to the second aspect of the present invention is the system of the first aspect of the present invention, wherein the dispersing means comprises a first electrical charging means that electrically charges the powdered seasoning.

In the second aspect of the present invention, because the powdered seasoning is electrically charged by the first electrical charging means, the powdered seasoning more favorably adheres to the intermediate articles due to the electrostatic effect.

The seasoning processing system according to the third aspect of the present invention is the system of the first or the second aspect of the present invention, wherein the packaging means has a former, a longitudinal sealing means, and a transverse sealing means. The former tubularly bends a strip packaging material. The longitudinal sealing means welds the overlapped edge parts of the packaging material tubularly bent by the former. The transverse sealing means welds in the transverse direction and forms in a bag shape the tubular packaging material while moving together with the tubular packaging material from an upstream position to a downstream position. Further, the dispersing mouth of the dispersing means is provided and arranged at a position more on the upstream side of the upstream position where the transverse sealing means begins welding.

According to the third aspect of the present invention, the dispersing mouth that disperses the powdered seasoning is provided and arranged at a position on the upstream side of the position where the welding by the transverse sealing means begins, and the dispersing mouth can consequently be installed fixedly. Accordingly, the structure of the dispersing means is simplified.

The seasoning processing system according to the fourth aspect of the present invention is the system of the third aspect of the present invention, wherein a substitute gas passageway that introduces substitute gas inside the bag shaped packaging material is provided inside the former. This substitute gas passageway also serves as the passageway for the powdered seasoning of the dispersing means. Further, a downstream side opening of the substitute gas passageway also serves as the dispersing mouth of the dispersing means.

According to the fourth aspect of the present invention, the downstream side opening of the substitute gas passageway is made to also serve as the dispersing mouth that disperses the powdered seasoning, and therefore additional members or fabrication for installing the dispersing mouth is omitted, thus achieving a low cost seasoning processing system.

The seasoning processing system according to the fifth aspect of the present invention is the system of the first or the second aspect of the present invention, wherein the packaging means has a former, a longitudinal sealing means, and a transverse sealing means. The former tubularly bends a strip packaging material. The longitudinal sealing means welds the overlapped edge parts of the packaging material tubularly bent by the former. The transverse sealing means welds in the transverse direction and forms in a bag shape the tubular packaging material while moving together with the tubular packaging material from an upstream position to a downstream position. In addition, the seasoning processing system according to the fifth invention further comprises a transferring means. The transferring means causes the dispersing mouth of the dispersing means to penetrate between the upstream position and the downstream position where the transverse sealing means moves, and, when the transverse sealing means is at the upstream position, to withdraw the dispersing mouth of the dispersing means to a position on the upstream side of that upstream position.

According to the fifth aspect of the present invention, because the dispersing mouth of the dispersing means is, for example, moved downstream by the transferring means during the movement of the transverse sealing means to the downstream position and because the dispersing mouth is positioned at a position in the vicinity of the intermediate articles supplied inside the bag shaped packaging material, the dispersed powdered seasoning can be favorably adhered to the intermediate articles. In this case, because the dispersing mouth is further spaced apart from the downstream side end part of the former, the area of the apparatus to be cleaned is further reduced, thus improving cleanability.

Furthermore, because the dispersing mouth of the dispersing means is moved to a position more on the upstream side of the upstream position of the transverse sealing means during the time period until the transverse sealing means starts the welding of the next cycle, the dispersing mouth does not interfere with the transverse sealing means, and does not hinder the prescribed operation of the transverse sealing means.

The seasoning processing system according to the sixth aspect of the present invention is the system of any one of the second through fifth aspects of the present invention, wherein the dispersing means disperses the powdered seasoning within a prescribed time period during the operating cycle performed by the transverse sealing means.

According to the sixth aspect of the present invention, because the powdered seasoning is dispersed within a prescribed time period during the operating cycle of the transverse sealing means, it is unnecessary to separately ensure a time period for dispersing the powdered seasoning within one series of a bag manufacturing cycle, thus enabling the sustained acceleration of the packaging means.

For example, if the dispersing mouth is provided and arranged at a position on the upstream side of the upstream position where the transverse sealing means begins welding, as in the third aspect of the present invention, then the powdered seasoning should be dispersed during the supply of the intermediate articles into the bag shaped packaging material.

However, in the case of the arrangement according to the fifth aspect of the present invention, the powdered seasoning should be dispersed after the supply of the intermediate articles into the bag shaped packaging material.

The seasoning processing system according to the seventh aspect of the present invention is the system of any one of the second through the sixth aspects of the present invention, wherein the transverse sealing means comprises a pair of sealing jaws that pinch and weld the tubular packaging material. In addition, the seasoning processing system according to the seventh invention further comprises a second electrical charging means. The second electrical charging means forms an electric field between the pair of sealing jaws and electrically charges the packaging material with a prescribed polarity.

According to the seventh aspect of the present invention, if the powdered seasoning is electrically charged and dispersed, then the powdered seasoning and the packaging material will repel one another because the powdered seasoning and the packaging material are electrically charged with the same polarity. Accordingly, it is possible to prevent the powdered seasoning from getting caught in the transverse seal part of the packaging material, thus achieving a reliable transverse seal part.

However, if the intermediate articles are electrically charged and supplied, then electrically charging the intermediate articles and the packing material with the same polarity results in the mutual repelling of the packaging material and the intermediate articles or chips of the intermediate articles. Accordingly, it is possible to prevent the intermediate articles or chips of the intermediate articles from getting caught in the transverse seal part of the packaging material, thus achieving a reliable transverse seal part.

The seasoning processing system according to the eighth aspect of the present invention is the system of any one of the first through seventh aspects of the present invention, further comprising a shaking means. The shaking means shakes the packaged bag formed by disposing and packaging said seasoned articles into the bag shaped packaging material.

According to the eighth aspect of the present invention, the seasoned articles and the powdered seasoning inside the bag are more favorably mutually mixed, thus obtaining seasoned articles that are more uniformly seasoned.

PREFERRED EMBODIMENTS

The following explains the seasoning processing system according to the present embodiment of the present invention.

Constitution of the Seasoning Processing System

Figure 1:
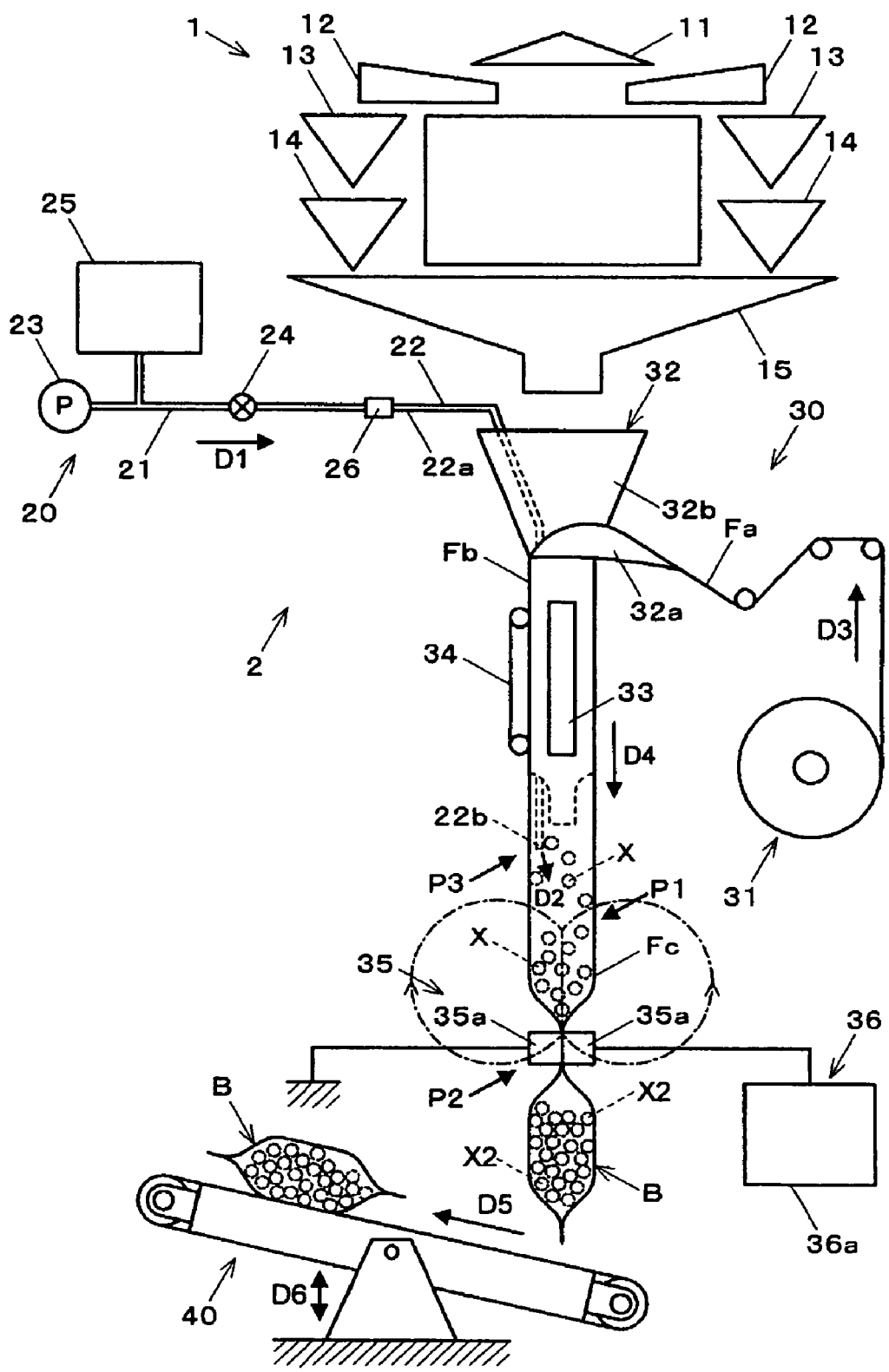
FIG. 1 is a schematic side view that depicts an example of applying the seasoning processing system according to the present embodiment of the present invention.

As shown in FIG. 1, a seasoning processing system 2 provided downstream of a combination weigher 1 performs seasoning processing on intermediate articles X . . . X weighed to a prescribed weight, and continuously manufactures bags B wherein the obtained seasoned articles X2 . . . X2 are packaged, and therefore comprises a seasoning dispersion apparatus 20, a vertical pillow-type bag manufacturing and packaging apparatus 30, and a transfer conveyor 40. Furthermore, "front," "rear," "left" and "right" in the explanation below respectively indicate "near side," "far side," "left" and "right" in the front view.

The combination weigher 1 comprises a vibrating type dispersion table 11, a plurality of radial troughs 12 . . . 12, a vertical pair of pool hoppers 13 . . . 13 and weigh hoppers 14 . . . 14, and a collection chute 15. The plurality of radial troughs 12 . . . 12 is radially arranged around the dispersion table 11. The pool hoppers 13 . . . 13 and the weigh hoppers 14 . . . 14 are circularly arranged corresponding to the radial troughs 12 . . . 12. The collection chute 15 is arranged below the weigh hoppers 14 . . . 14. The intermediate articles X . . . X supplied onto the dispersion table 11 are dispersed and supplied to the radial troughs 12 . . . 12, after which they are supplied via the pool hoppers 13 . . . 13 to the weigh hoppers 14 . . . 14. When the weights of the intermediate articles X . . . X supplied to the weigh hoppers 14 . . . 14 are measured, a combination calculation is performed. As a result of the combination calculation, the intermediate articles X . . . X are discharged from the weigh hoppers 14 . . . 14 corresponding to the combination that comprises the prescribed weight, whereupon those intermediate articles X . . . X are collected by the collection chute 15, and discharged to a bag manufacturing and packaging apparatus 30 disposed below.

The seasoning dispersion apparatus 20 comprises an upstream first conduit 21, a downstream second conduit 22, a compressor 23 connected to one end part of the first conduit 21 and that supplies compressed air in the arrow D1 direction, a switching valve 24, a fixed amount seasoning feeder 25, and an electrostatic gun 26. The switching valve 24 is provided midway in the first conduit 21, and performs on-off control and flow control of the compressed air flow. The fixed amount seasoning feeder 25 is coupled to the first conduit 21 between the compressor 23 and the switching valve 24, and supplies a fixed amount of the powdered seasoning. The electrostatic gun 26 is attached to the other end part of the first conduit 21, and disperses the powdered seasoning electrically charged with a prescribed polarity.

The electrostatic gun 26 is connected to one end part 22a of the second conduit 22. The other end part 22b of the second conduit 22 is inserted into a tube member 32b that constitutes the former 32 of the bag manufacturing and packaging apparatus 30, discussed later. Accordingly, the electrostatic gun 26 disperses the powdered seasoning inside the tube member 32b from the end part 22b as shown by the arrow D2.

The bag manufacturing and packaging apparatus 30 comprises a roll holding unit 31, the former 32, a pair of pull down belts (only one is shown) 33, 33, a longitudinal sealing apparatus 34, and a transverse sealing apparatus 35. The roll holding unit 31 pays out a strip packaging material Fa as shown by the arrow D3. The former 32 comprises a sailor collar shaped member 32a and the tube member 32b, and overlaps both the left and right edge parts of the paid out strip packaging material Fa to form a tubular shape. The pair of pull down belts 33, 33 is arranged one on the left side and one on the right side of the tube member 32b, and conveys a tubular packaging material Fb downward, as shown by the arrow D4, while pressing against the tube member 32b. The longitudinal sealing apparatus 34 is arranged on the front surface of the tube member 32b, and welds the overlapping part of the tubular packaging material Fb. The transverse sealing apparatus 35 clamps the tubular packaging material Fb from both sides at the front and rear, welds the packaging material Fb at a prescribed position in the transverse direction, and cuts the tubular packaging material Fb in the vicinity of the welded part in the transverse direction. Thereby, above the cut part is formed a bag shaped packaging material Fc having a bottom part and that receives the drop supplied intermediate articles X . . . X, and below the cut part is formed the bag B that was filled with the seasoned articles X2 . . . X2. To explain in greater detail, the transverse sealing apparatus 35 comprises a pair of front and rear sealing jaws 35a, 35a for clamping and welding the tubular packaging material Fb. Each of the sealing jaws 35a, 35a has a built-in heater, not shown, and one of them has a built-in cutter, not shown. Furthermore, the sealing jaws 35a, 35a move in a substantially D shape viewed from the side, as shown by the chain line in FIG. 1, interpose and opposingly contact the tubular packaging material Fb at the position shown by the symbol P1 to start the welding, and breakaway at the position shown by the symbol P2 to end the welding. In other words, the sealing jaws 35a, 35a move vertically during the time period of movement between the weld starting position P1 and the weld ending position P2.

Furthermore, the end part 22b of the second conduit 22 is set in the vicinity of the lower end part of the tube member 32b, i.e., at the position indicated by the symbol P3 above the weld starting position P1 in the bag shaped packaging material Fc.

In addition, an electric field is formed between the sealing jaws 35a, 35a in the bag manufacturing and packaging apparatus 30, and an electrical charging apparatus 36 is provided that electrically charges the tubular packaging material Fb with a prescribed polarity. One of the sealing jaws 35a is connected to a high voltage power supply 36a, and the other sealing jaw 35a is grounded. In other words, when a high voltage is applied by the high voltage power supply 36a, a prescribed electric field is formed between the sealing jaws 35a, 35a, and the tubular packaging material Fb between the sealing jaws 35a, 35a is electrically charged with a prescribed polarity.

The transfer conveyor 40 conveys the bag B discharged from the bag manufacturing and packaging apparatus 30 downstream, as shown by the arrow D5, to, for example, a seal checker or a weight checker. The transfer conveyor 40 is constituted capable of imparting a vibration, shown by the arrow D6, so that the bag B during transfer can be shaken.

Operation and Features of the Seasoning Processing System

The following explains an operational example of the seasoning processing system 2, while explaining its features.

First, when the intermediate articles X . . . X weighed to a prescribed weight begin to fall from the combination weigher 1 and be supplied to the bag manufacturing and packaging apparatus 30, i.e., into the bag shaped packaging material Fc, the powdered seasoning is dispersed from the end part 22b, which is the dispersing mouth of the powdered seasoning, of the second conduit 22.

In other words, powdered seasoning of a prescribed amount in accordance with one bag's worth is supplied from the seasoning dispersion apparatus 20 to the first conduit 21 by the fixed amount seasoning feeder 25. This powdered seasoning is conveyed to the first conduit 21 by the compressed air supplied from the compressor 23, and is dispersed toward the second conduit 22 by the electrostatic gun 26 and electrically charged with a prescribed polarity (a polarity the reverse of the intermediate articles X . . . X).

The powdered seasoning introduced from the first conduit 21 to the second conduit 22 is dispersed from the end part 22b of the second conduit 22, positioned at the dispersion position P3 inside the tube member 32b, into the bag shaped packaging material Fc, as shown by the arrow D2. As a result, the dispersed powdered seasoning favorably adheres to the intermediate articles X . . . X while being drop supplied, due to the electrostatic effect, thus easily achieving the seasoned articles X2 . . . X2.

Furthermore, because powdered seasoning of a weight in accordance with one bag's worth of intermediate articles X . . . X is dispersed, a fixed amount of powdered seasoning adheres to the intermediate articles X . . . X, enabling continuous, uniform seasoning processing. Furthermore, the wasteful consumption of the powdered seasoning is avoided, e.g., the powdered seasoning collecting apparatus that was needed in the conventional system is no longer required.

In addition, because the powdered seasoning is dispersed inside the bag shaped packaging material Fc, the area of the apparatus to which the powdered seasoning adheres, or the area of the apparatus that contacts the seasoned articles X2 . . . X2 to which the powdered seasoning has adhered, is reduced. In other words, by positioning the end part 22b, which is the dispersing mouth of the powdered seasoning, of the second conduit 22 in the vicinity of the lower end part of the tube member 32b, the area of the apparatus to be cleaned is localized to the lower end part of the tube member 32b, and the like, thus facilitating the cleaning work. Thereby, a seasoning processing system 2 having superior cleanability is achieved.

Furthermore, when the supplying of the intermediate articles X . . . X and the dispersing of the powdered seasoning end, the tubular packaging material Fb is welded (transverse sealed) by the transverse sealing apparatus 35. Thereby, a bag B filled with the seasoned articles X2 . . . X2 is obtained below the weld portion, and a bag shaped packaging material Fc, wherein the intermediate articles X . . . X of the next cycle are drop supplied, is formed above the weld portion.

At this point, after the end part 22b of the second conduit 22 is set at the dispersion position P3 above the weld starting position P1, the end part 22b can be fixedly installed without interfering with the transverse sealing apparatus 35. In other words, the installation structure of the end part 22b is simplified.

In addition, at this point, the powdered seasoning is dispersed within a prescribed time period in the operating cycle of the transverse sealing apparatus 35, i.e., during the drop supplying of the intermediate articles X . . . X. Consequently, it is unnecessary to separately ensure a time period for dispersing the powdered seasoning within one series of a bag manufacturing cycle, thus enabling the sustained acceleration of the bag manufacturing and packaging apparatus 30.

Furthermore, by the electrical charging apparatus 36 forming a prescribed electric field between the sealing jaws 35a, 35a prior to making opposing contact (before they mutually contact), the tubular packaging material Fb between the sealing jaws 35a, 35a is electrically charged with a prescribed polarity. However, because the powdered seasoning also comes to be electrically charged and dispersed, the powdered seasoning and the tubular packaging material Fb are electrically charged with the same polarity, thereby resulting in the powdered seasoning and the packaging material Fb repelling one another. Accordingly, it is possible to prevent the powdered seasoning from getting caught in the transverse seal part of the packaging material Fb.

Furthermore, unlike the present embodiment, if the intermediate articles X . . . X come to be electrically charged and dispersed, then electrically charging the intermediate articles X . . . X and the tubular packaging material Fb with the same polarity results in the mutual repelling of the packaging material Fb and the intermediate articles X . . . X or chips of the intermediate articles X . . . X. Thereby, it is possible to prevent the intermediate articles X . . . X or chips from the intermediate articles X . . . X from getting caught in the transverse seal part of the packaging material Fb.

The bag B obtained by cutting with the cutter built into one sealing jaw 35a of the transverse sealing apparatus 35 is transferred to the transfer conveyor 40 below. Because the transfer conveyor 40 has a vibrating function, the bag B is shaken while being conveyed. As a result, the seasoned articles X2 . . . X2 and the powdered seasoning inside the bag B are more favorably mixed together, thus achieving a more uniform seasoning of the seasoned articles X2 . . . X2 in the bag B. Furthermore, if seasoned articles X2 . . . X2 that are sufficiently uniformly seasoned are obtained even if the bag B is not shaken, then it is acceptable to use an ordinary relay conveyor having no vibrating function in place of the transfer conveyor 40 having a vibrating function.

Other Embodiments (A)

In the abovementioned embodiment, the powdered seasoning is dispersed inside the bag shaped packaging material Fc by inserting the end part 22b of the second conduit 22 inside the tube member 32b.

Figure 2:
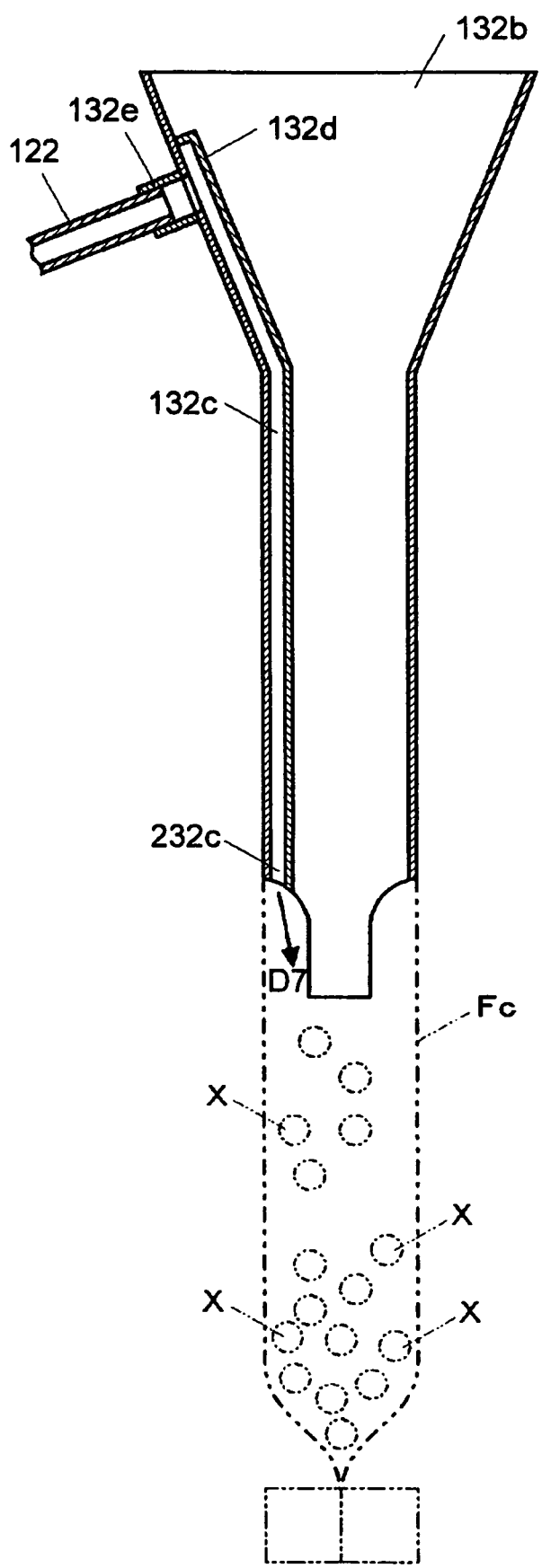
FIG. 2 is a side cross-sectional view of the tube member wherein the gas substitute passageway is provided.

In contrast, if a substitute gas passageway 132c is provided for substituting the air inside the bag shaped packaging material Fc with an inactive gas, as in the tube 132b shown in FIG. 2, then it is also acceptable to make the dispersing mouth of the powdered seasoning also serve as a lower opening 232c of the substitute gas passageway 132c. In the following explanation, constituent elements in common with the abovementioned embodiment are assigned the same symbol, unless it would particularly invite confusion.

The substitute gas passageway 132c, which extends generally in the vertical direction, is formed by affixing a plate material 132d on the inner side of the front surface side of the tube 132b. In addition, an entrance 132e in communication with the substitute gas passageway 132c is provided on the front surface of the relatively upper part of the tube 132b, and a second conduit 122 is connected to the entrance 132e.

The powdered seasoning supplied from the second conduit 122 passes through the substitute gas passageway 132c, is dispersed from the lower opening 232c inside the bag shaped packaging material Fc as shown by the arrow D7, and adheres to the intermediate articles X . . . X drop supplied to the bag shaped packaging material Fc. Accordingly, at this point, additional members or fabrication for installing the dispersing mouth is omitted, thus realizing the seasoning processing system at a low cost.

(B)

In the abovementioned embodiment, shaking the bag B during conveying by the transfer conveyor 40, which imparts a vibration, more favorably mutually mixes the seasoned articles X2 . . . X2 and the powdered seasoning inside the bag B.

Figure 3:
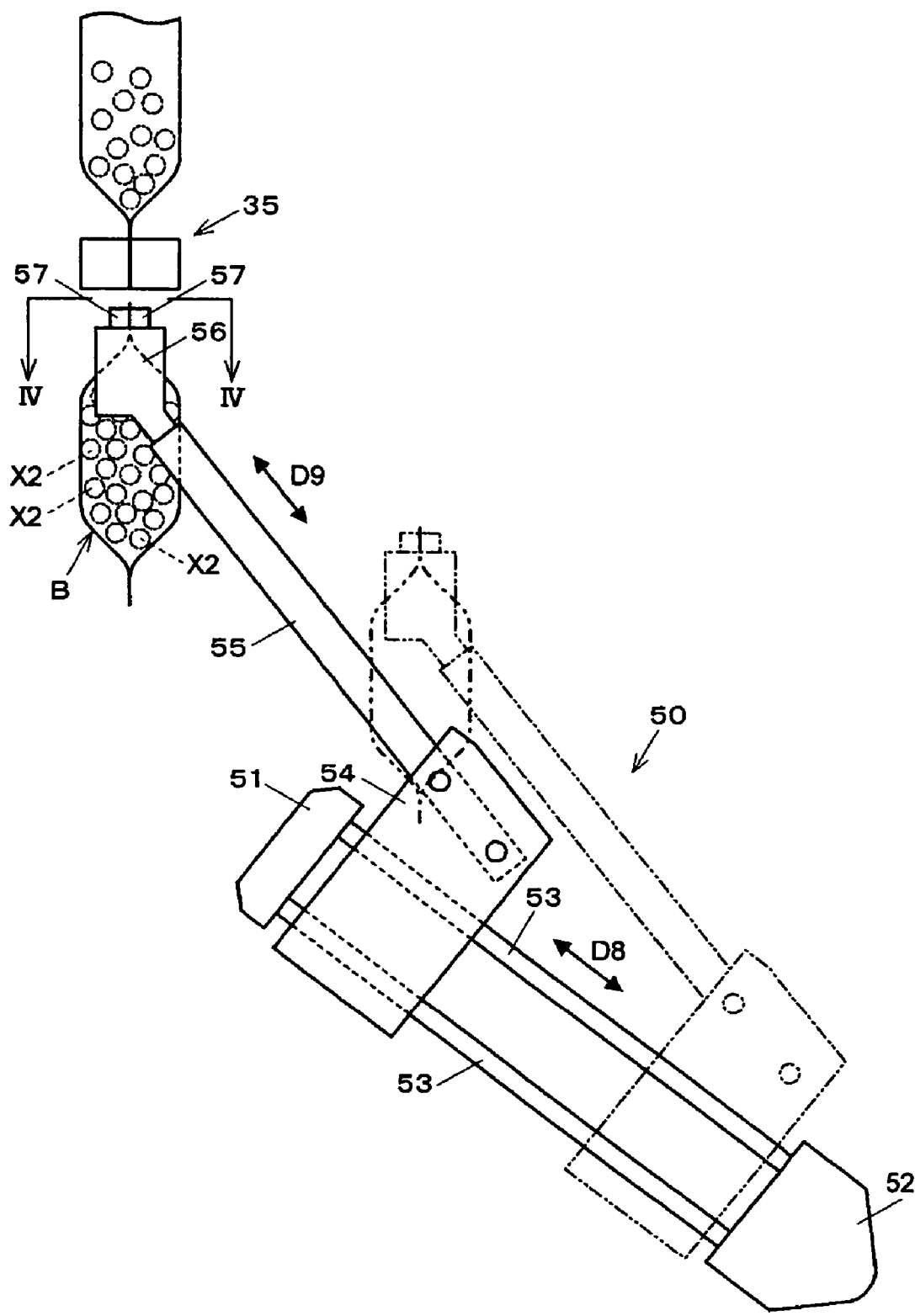
FIG. 3 is a side view of the principle elements of the shaking apparatus.
Figure 4:
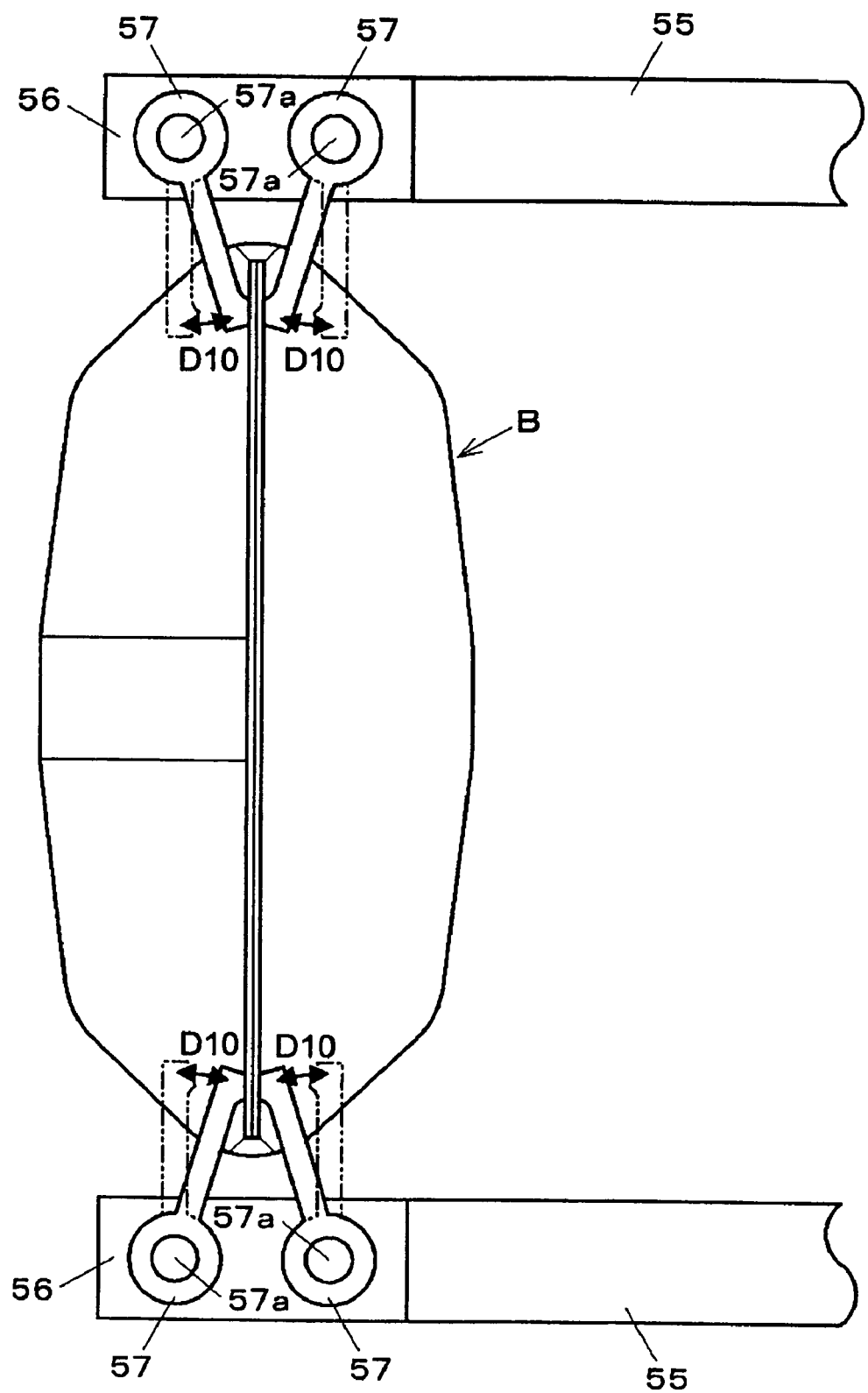
FIG. 4 is an auxiliary view taken along IV—IV in FIG. 3.

In place of such a constitution, it is also acceptable to use a lateral pair of shaking apparatuses 50, 50 that grasps and shakes the bag B, as shown in FIG. 3 and FIG. 4. In the following explanation, constituent elements in common with the abovementioned embodiment are assigned the same symbol, unless it would particularly invite confusion.

Each shaking apparatus 50 comprises upper and lower support members 51, 52, a pair of rail members 53, 53, a slide member 54, a long, thin arm member 55, a transfer member 56, and a pair of grasping members 57, 57. The upper and lower support members 51, 52 are fixed to a frame (not shown). The pair of rail members 53, 53 is provided so that they bridge the support members 51, 52. The slide member 54 is assembled to the rail members 53, 53 so that it is freely slidable in the arrow D8 direction. One end part of the arm member 55 is fixed to the slide member 54. The transfer member 56 is fixed to the other end part of the arm member 55. The pair of grasping members 57, 57 is provided and arranged on the transfer member 56.

Furthermore, in each shaking apparatus 50, the slide member 54 moves reciprocatingly in the arrow D8 direction by means of a drive mechanism (not shown), and the arm member 55 moves reciprocatingly in the arrow D9 direction. Each grasping member 57 rotates around a spindle 57a by means of a drive mechanism (not shown), as shown by the arrow D10, and the tip end parts of each pair of grasping members 57, 57 grasp from both sides at the front and rear an upper end part of the bag B that was welded, cut and discharged by the transverse sealing apparatus 35.

As shown in FIG. 4, the slide member 54 is moved reciprocatingly in the arrow D8 direction in a prescribed time period in a state wherein the four grasping members 57 . . . 57 grasp the upper end part of the bag B. In so doing, the bag B is shaken in the arrow D9 direction (refer to FIG. 3), and the seasoned articles X2 . . . X2 and the powdered seasoning are more favorably mutually mixed inside the bag B.

(C)

In place of the shaking apparatuses 50, 50 of the abovementioned other embodiment (B), it is also acceptable to use a shaking mechanism, as recited in Japanese Published Patent Application No. 2000-95205. In other words, the upper end part of the bag B that was welded, cut, and discharged by the transverse sealing apparatus 35 is grasped from both sides at the front and rear by the shaking mechanism and shaken in the vertical direction. This case also obtains the same effect as that obtained by using the abovementioned shaking apparatuses 50, 50.

(D)

In the abovementioned embodiments, the end part 22b of the second conduit 22 is set at the dispersion position P3 above the weld starting position P1.

Figure 5:
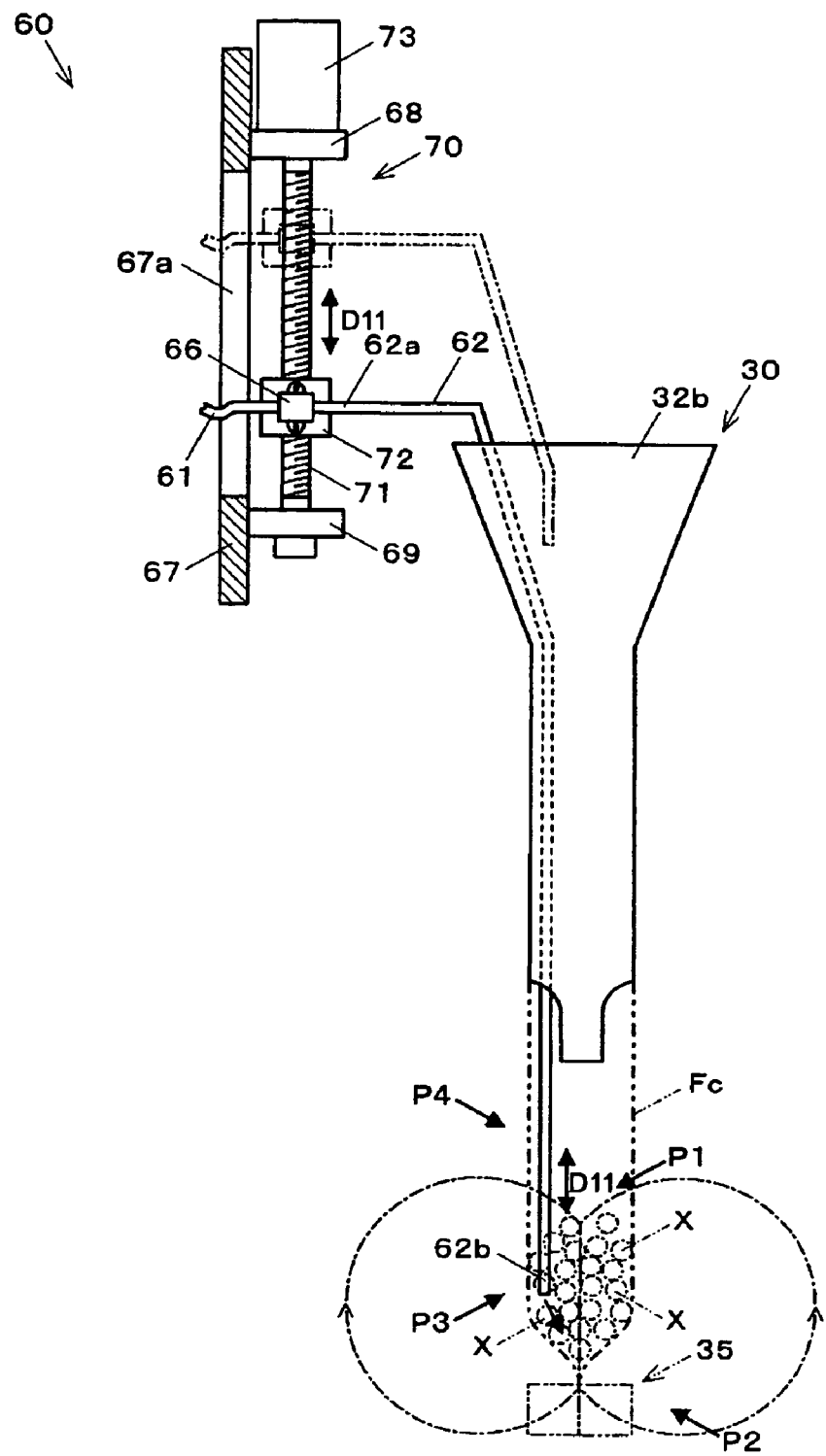
FIG. 5 is a side view of the principle elements that explains the mechanism that raises and lowers the end part of the second conduit.

In place of such a constitution, it is also acceptable to cause an end part 62b, which is the dispersing mouth of a seasoning dispersion apparatus 60, of a second conduit 62 to penetrate at the dispersion position P3 between the weld starting position P1 and the weld ending position P2, as shown in FIG. 5, and to move it so that it withdraws to the withdrawn position P4 above the weld starting position P1. Furthermore, in the following explanation, constituent elements in common with the abovementioned embodiments are assigned the same symbol, unless it would particularly invite confusion.

In the seasoning dispersion apparatus 60 shown in FIG. 5, a pair of upper and lower support members 68, 69 is fixedly provided on the surface on the bag manufacturing and packaging apparatus 30 side of a support plate 67 having an opening fixed at a suitable location of the seasoning processing system. Furthermore, a lift mechanism 70 that raises and lowers the end part 62b, which is the dispersing mouth, of the second conduit 62 is supported by both support members 68, 69.

The lift mechanism 70 comprises a screw shaft 71, an internal thread block 72, and a motor 73. The screw shaft 71 is rotatably provided so that it bridges both support members 68, 69. The internal thread block 72 screws onto the screw shaft 71, and moves in the arrow D11 direction by the rotation of the screw shaft 71. The motor 73 is provided and arranged on the upper support member 68, and the output shaft thereof is coupled to the upper end part of the screw shaft 71. An electrostatic gun 66 is fixed to the internal thread block 72. The end part of a first conduit 61 and one end part 62a of the second conduit 62 are connected to the electrostatic gun 66. The other end part 62b, which is the dispersing mouth, of the second conduit 62 is inserted into the tube member 32b. Furthermore, the first conduit 61 is freely movable in the arrow D11 direction via an opening 67a of the support plate 67.

In the seasoning dispersion apparatus 60, when the transverse sealing apparatus 35 is positioned at weld starting position P1, the end part 62b of the second conduit 62 withdraws to the withdrawn position P4 above the weld starting position P1. However, when the transverse sealing apparatus 35 drops between the weld starting position P1 and the weld ending position P2, the internal thread block 72 and the second conduit 62 can be moved by the drive of the motor 73, as shown by the arrow D11, so that the end part 62b of the second conduit 62 is positioned at the dispersion position P3. Furthermore, if the powdered seasoning is dispersed from the end part 62b at the dispersion position P3 after the intermediate articles X . . . X are drop supplied, then the powdered seasoning favorably adheres to the intermediate articles X . . . X inside the bag shaped packaging material Fc, making it easy to achieve seasoned articles.

At this point, compared with the end part 22b of the second conduit 22 in the abovementioned embodiments, the end part 62b of the second conduit 62 (i.e., the dispersion position P3) is further spaced apart from the lower end part of the tube member 32b. Consequently, the area of the apparatus to be cleaned is further reduced, thus improving cleanability.

Furthermore, after the powdered seasoning is dispersed at the dispersion position P3 and until the transverse sealing apparatus 35 starts the next cycle weld (in other words, until the transverse sealing apparatus 35 is positioned at the next cycle weld starting position P1), the lift mechanism 70 withdraws the end part 62b of the second conduit 62 to the withdrawn position P4 above the weld starting position P1. Consequently, the end part 62b of the second conduit 62 does not interfere with the transverse sealing apparatus 35, and does not hinder the prescribed operation of the transverse sealing apparatus 35.

In addition, because the powdered seasoning is dispersed in a prescribed time period (herein, after the drop supply of the intermediate articles X . . . X) during the operating cycle of the transverse sealing apparatus 35, there is no need to separately ensure a time period for dispersing within one series of a bag manufacturing cycle, thus enabling the sustained acceleration of the bag manufacturing and packaging apparatus 30.

(E)

In the abovementioned embodiment, a vertical pillow-type bag manufacturing and packaging apparatus 30 was used as the packaging means, but it is also acceptable to use a horizontal pillow-type bag manufacturing and packaging apparatus. In addition, it is also acceptable to use, in place of the abovementioned bag manufacturing and packaging apparatus 30, a bag feeding and packaging apparatus that supplies packaging material already formed in bags, and that packages the seasoned articles X2 . . . X2 in the bag shaped packaging material.

INDUSTRIAL FIELD OF APPLICATION

As explained above, the present invention provides a seasoning processing system capable of uniform seasoning processing and, moreover, having superior cleanability. In other words, the present invention relates to a system that performs the process of seasoning intermediate articles using the static electric effect, and is broadly and ideally suited to the technology field of foodstuffs manufacturing.

The invention claimed is:

1. A seasoning processing system, comprising:
   dispersing means that disperses from a dispersing mouth powdered seasoning to be adhered to supplied intermediate articles, said dispersing means comprising first electrical charging means that electrically charges said powdered seasoning; and
   packaging means that forms a tubular shaped packaging material such that the dispersing mouth is provided inside the tubular shaped packaging material, and packages the tubular shaped packaging material into a packaged bag such that the seasoned articles to which said powdered seasoning has been adhered are inside the packaged bag, the packaging means comprising a transverse sealing mechanism having a pair of sealing jaws that pinch and weld said tubular shaped packaging material, and an electrical charging apparatus connected to a high voltage power supply that forms an electric field between said pair of sealing jaws and electrically charges said tubular shaped packaging material with a prescribed polarity;
   wherein said powdered seasoning and said packaging material are electrically charged with the same polarity.

2. The seasoning processing system as recited in claim 1, wherein
   said packaging means comprises:
      a former that tubularly bends a strip packaging material; and
      longitudinal sealing means that welds overlapped edge parts of the packaging material tubularly bent by said former;
   said transverse sealing means welds in a transverse direction and forms in a bag shape said tubular packaging material while moving together with said tubular packaging material from an upstream position to a downstream position; and
   said dispersing mouth is provided and arranged at a position on an upstream side of said upstream position where said transverse sealing means begins welding.

3. The seasoning processing system as recited in claim 2, wherein
   said dispersing means includes a substitute gas passageway that introduces substitute gas inside the tubular shaped packaging material and is provided inside said former, such that said substitute gas passageway serves as a passageway for said powdered seasoning of said dispersing means; and
   said dispersing mouth also includes a downstream side opening of said substitute gas passageway.

4. The seasoning processing system as recited in claim 1, wherein
   said packaging means comprises:
      a former that tubularly bends a strip packaging material; and
      longitudinal sealing means that welds overlapped edge parts of the packaging material tubularly bent by said former;
   said transverse sealing means welds in the transverse direction and forms in a bag shape said tubular packaging material while moving together with said tubular packaging material from an upstream position to a downstream position; and
   said seasoning processing system further comprises transferring means that causes said dispersing mouth to penetrate between said upstream position and said downstream position, and, when said transverse sealing means is at said upstream position, to withdraw said dispersing mouth to a position on an upstream side of said upstream position.

5. The seasoning processing system as recited in claim 1, wherein
   said dispersing means disperses the powdered seasoning without stopping the operation of said transverse sealing means.

6. The seasoning processing system as recited in claim 1, further comprising:
   shaking means that grasps and shakes the packaged bag containing said seasoned articles.

7. A seasoning processing and bag manufacturing and packaging system adapted to receive a supply of intermediate articles and a supply of strip packaging material, and discharge a packaged bag containing seasoned articles, said seasoning processing and bag manufacturing and packaging system comprising:
   a seasoning dispersion apparatus comprising:
      a seasoning feeder containing seasoning to be applied to the intermediate articles,
      a conduit having a dispersing mouth from which the seasoning is dispersed to be adhered to the intermediate articles; and
      an electrostatic gun that electrically charges said powdered seasoning;
   and
   a bag manufacturing and packaging apparatus comprising:
      a longitudinal sealing mechanism that creates a tubular shaped packaging material from the strip packaging material, said dispersing mouth of said conduit being disposed inside the tubular shaped packaging material, and a transverse sealing mechanism that welds said tubular shaped packaging material in a transverse direction and forms said tubular packaging material into a packaged bag that contains the seasoned articles, said transverse sealing mechanism comprising a pair of sealing jaws that pinch and weld said tubular shaped packaging material, and an electrical charging apparatus connected to a high voltage power supply that forms an electric field between said pair of sealing jaws and electrically charges said packaging material with a prescribed polarity;

wherein said powdered seasoning and said packaging material are electrically charged with the same polarity.

8. The seasoning processing and bag manufacturing and packaging system as recited in claim 7, wherein said transverse sealing mechanism welds said tubular shaped packaging material in a transverse direction while moving together with said tubular packaging material from an upstream position to a downstream position, and said dispersing mouth is provided and arranged at a position on an upstream side of said upstream position where said transverse sealing mechanism begins welding.

9. The seasoning processing and bag manufacturing and packaging system as recited in claim 8, wherein said bag manufacturing and packaging apparatus includes a former that tubularly bends a strip packaging material, and said conduit includes a substitute gas passageway that introduces substitute gas inside the tubular shaped packaging material and is provided inside said former, said dispersing mouse including a downstream side opening of said substitute gas passageway.

10. The seasoning processing and bag manufacturing and packaging system as recited in claim 7, wherein said transverse sealing mechanism welds said tubular shaped packaging material in a transverse direction while moving together with said tubular packaging material from an upstream position to a downstream position, and said seasoning processing and bag manufacturing and packaging system further includes a lift mechanism that moves the dispersing mouth of the seasoning dispersion apparatus along a direction of the tubular shaped packaging material, such that when said transverse sealing mechanism is at said upstream position, said dispersing mouth is withdrawn to a position that is on an upstream side of said upstream position.

11. The seasoning processing and bag manufacturing and packaging system as recited in claim 7, wherein said seasoning dispersion apparatus disperses the powdered seasoning without stopping the operation of said transverse sealing mechanism.

12. The seasoning processing and bag manufacturing and packaging system as recited in claim 7, further comprising:

shaking means that grasps and shakes the packaged bag containing said seasoned articles.

* * * * *